May 12, 1964 D. R. AYER 3,133,207

TRANSMISSION LINE PACKAGE HAVING TRANSISTOR DISPOSED BETWEEN INNER CONDUCTING STRIPS

Filed Sept. 14, 1960 2 Sheets-Sheet 1

Donald R. Ayer
INVENTOR

Robert O. Richardson
ATTORNEY

Donald R. Ayer
INVENTOR
Robert O. Richardson
ATTORNEY

United States Patent Office 3,133,207
Patented May 12, 1964

3,133,207

TRANSMISSION LINE PACKAGE HAVING TRANSISTOR DISPOSED BETWEEN INNER CONDUCTING STRIPS

Donald R. Ayer, Nashua, N.H., assignor to Sanders Associates, Inc., Nashua, N.H., a corporation of Delaware Filed Sept. 14, 1960, Ser. No. 55,872
8 Claims. (Cl. 307—88.5)

The invention relates to the art of amplification and transmission of high frequency signals. More particularly, it relates to a unit in which a high frequency transistor is packaged in a section of strip transmission line.

With the development of high frequency transistors, the potential range of such devices in practical amplifiers has been moved up into the microwave region. However, it has been found that a limitation on the full realization of their potentialities exists in the form of the leads and housings generally inherent in transistor packaging. The various inductances and capacitances associated with prior physical constructions correspond to markedly significant impedances at microwave frequencies. Thus, they seriously affect the transmission of energy between a transistor and other parts of the circuit incorporating it.

Accordingly, an object of my invention is to provide an improved high frequency circuit construction incorporating a transistor.

A more specific object of my invention is to provide a circuit construction of the above character adapted for improved transmission of energy between the transistor and other elements of a circuit in which it is connected.

A further object of the invention is to provide a construction of the above type making fuller use of the space-saving potentialities of transistors.

A still further object of the invention is to provide a circuit construction of the above type which is relatively simple to fabricate.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

In general, my invention incorporates a transistor in a section of strip transmission line, with the transmission line serving as signal leads for the transistor. The preferred transmission line is of the general type disclosed in U.S. Patent No. 2,810,892 wherein two center conductors are employed. This patent has a pair of inner conducting strips in registration with each other and disposed between a pair of outer ground plane conductors. The inner strips are ordinarily in electrical contact with each other. However, in accordance with my invention, they are spaced apart in an isolated section thereof, and the transistor is mounted between and in contact with them in this section. Power for the transistor is supplied in a manner described below.

Figure 1:
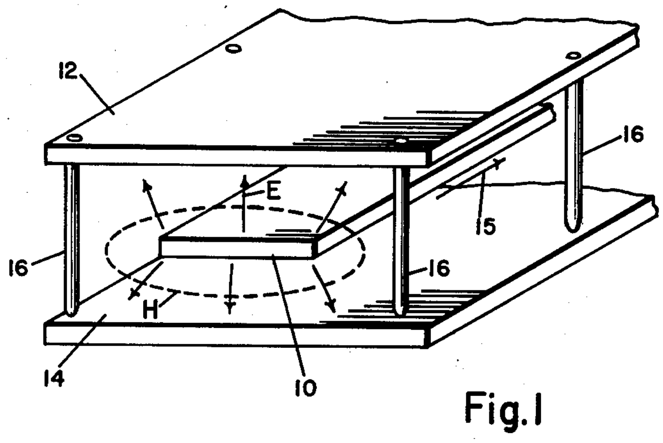
Figure 2:
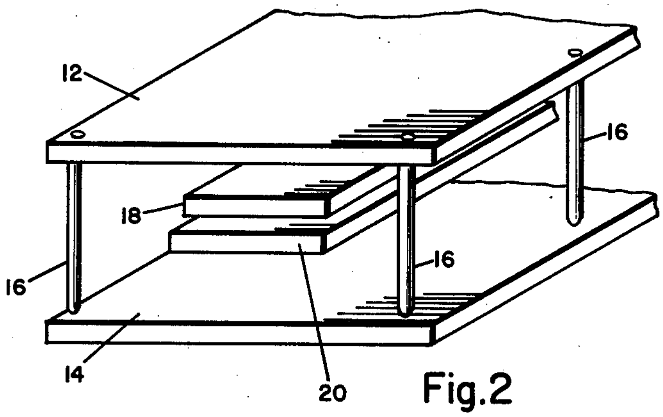
Figure 3:
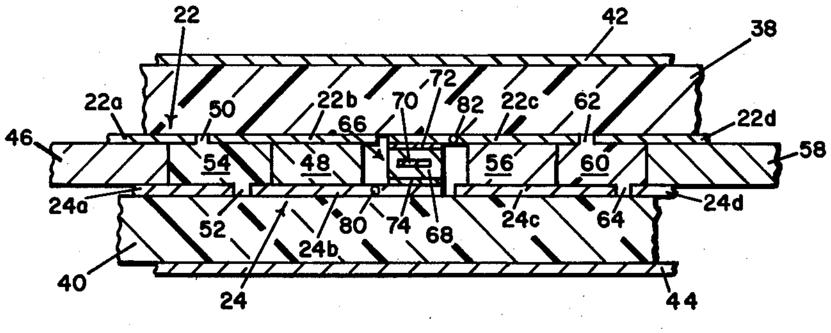
Figure 4:
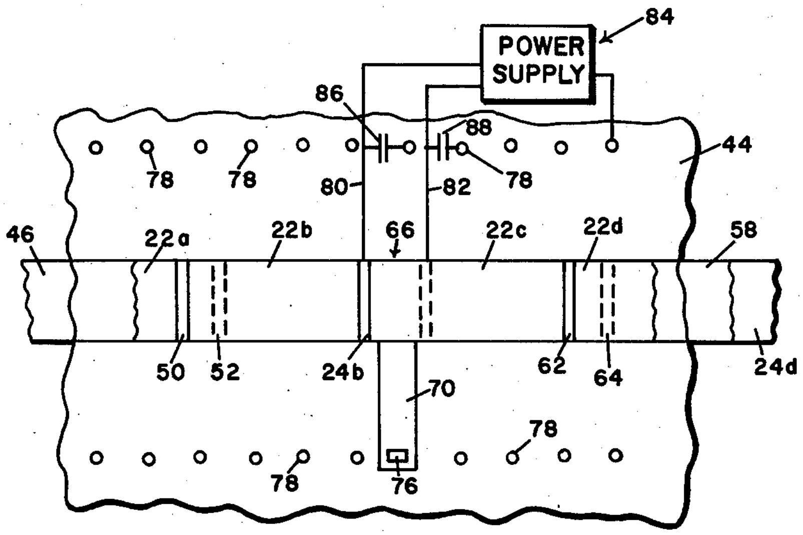

For a fuller understanding of the nature and objects of the invention, reference should be had to the following detailed description taken in connection with the accompanying drawings, in which:

FIGURE 1 is a transverse section of a strip transmission line, showing the configurations of the electric and magnetic fields between the conductors, FIGURE 2 is a simplified perspective view of a strip line using a split center conductor, FIGURE 3 is a longitudinal vertical section of a transistor amplifier embodying the features of my invention, and FIGURE 4 is a schematic view of the amplifier.

In FIGURE 1 we have illustrated the field distribution in a typical strip transmission line. The line has an inner conductor 10 situated between and parallel to a pair of outer ground plane conductors 12 and 14. The conductors 10, 12 and 14 are flat and may be quite thin. For example, they may be formed of foil bonded to dielectric material (not shown) filling the space between them. At an instant of time when the conductor 10 is positive with respect to the ground planes 12 and 14 and the current in the conductor 10 is in the direction of the arrow 15, the field distribution in the transmission line is as shown in FIGURE 1, with the solid arrows representing the electric field E and the dash lines representing the magnetic field H.

The field configuration of FIGURE 1 is indicative of the TEM propagation mode. However, it is possible to transmit other modes on the line under certain conditions. For example, if the inner conductor 10 is offset from its nominal position midway between the ground planes 12 and 14, the ground planes will be at somewhat different potentials. This difference in voltage will support a parallel plate mode. Accordingly, the ground planes are "shorted" together by a plurality of pins 16 spaced along both edges of the inner conductor. The pins impose an equipotential condition on the planes and thereby suppress this mode. For effective suppression, the spacing of the pins in the lengthwise direction of the line should be less than a half wavelength. Ordinarily, this spacing is on the order of one-eighth wavelength or less.

Another limitation on pin spacing results from the desirability of avoiding a resonant condition in any loop defined by the ground planes and a pair of adjacent pins. A resonant loop will distort the transmission characteristics of the line as well as facilitate radiation of energy therefrom. Resonance occurs when the length of the loop is an integral number of wavelengths, and accordingly, the distance between adjacent pins should be considerably less than the spacing providing a wavelength loop.

If either of the transverse dimensions, i.e., ground plane-ground plane or pin-pin spacing is greater than a half wavelength, a transverse electrical waveguide mode may be excited. Therefore, both these dimensions should be less than a half wavelength. There is also a restriction on the length of the circumferential path around the inner conductor 10 and passing midway between the inner conductor and the ground planes 12 and 14 and pins 16. This path should be less than a wavelength. Otherwise, the line will support a higher order transverse electric transmission line mode.

In FIGURE 2 there is shown a variation of strip line in which the center conductor comprises a pair of strips 18 and 20, preferably in register with each other, i.e., one lies directly over the other. Generally, though not necessarily, they are electrically connected to each other throughout their lengths. Transmission line of this type is more fully disclosed in U.S. Patent No. 2,810,892 noted above. Its use is highly advantageous in conditions where the line is subject to flexure. In a line with a single center conductor, flexure will produce variations in the spacing between the strip and the ground plane conductors in such manner as to substantially change the characteristic impedance of the line. In a line using a pair of center strips as in FIGURE 2, with each conductor affixed to a separate piece of dielectric material, flexure will cause the strips to part, but their distances from the adjacent ground planes remain substantially unchanged. It has been found that, in this situation, the characteristic impedance of the line is virtually unaffected.

As seen in FIGURE 3, a circuit incorporating the features of my invention includes a section of strip transmission line provided with a center conductor including registering conducting strips 22 and 24. The strips are preferably bonded to insulators 38 and 40, to which are affixed ground plane conductors 42 and 44. Sections 22*a* and 24*a* of the strips 22 and 24 are separated by a metallic spacer 46 and, similarly, a metallic spacer 48 is disposed between strip sections 22*b* and 24*b*. The spacers 46 and 48 serve to ensure equipotential conditions between corresponding points of the conducting strips which they connect.

The strip sections 22*a* and 22*b* are separated by a gap 50, and the sections 24*a* and 24*b* by a gap 52, the gaps 50 and 52 being longitudinally spaced from each other to provide overlapping of the sections 22*b* and 24*a*. In the region of the gaps 50 and 52, a spacer 54 of dielectric material is provided, and the overlapping portions of the sections 22*b* and 24*a*, together with the spacer 54, thus form a blocking capacitor between the strip pairs 22*a*—24*a* and 22*b*—24*b*. Assuming that there is sufficient overlap, together with a sufficient dielectric constant for the spacer 54, the impedance of this capacitor will be negligible at the frequency of operation, and therefore, at this frequency the gaps 50 and 52 may be considered nonexistent. Since the spacing between the parallel conducting strips will ordinarily be a few thousandths of an inch, this condition is easily obtained. The gaps 50 and 52 should be as narrow as practicable in order to minimize discontinuities in the characteristic impedance of transmission line at these points.

In like manner, conducting strip sections 22*c* and 24*c*, and 22*d* and 24*d* are separated by conducting spacers 56 and 58. A dielectric spacer 60 fills the space encompassed by gaps 62 and 64 to form a second blocking capacitor similar to the one described above.

Still referring to FIGURE 3, the conducting strip sections 22*c* and 24*b* overlap, and a transistor generally indicated at 66 is disposed between the overlapping portions of these sections. The transistor is preferably encased in a ceramic housing 68, with an emitter lead 70 in the form of a flat strip emerging from the housing 68 approximately in the center thereof. The upper and lower faces of the housing 68 are provided with electrodes 72 and 74, respectively, connected to the collector and base of a transistor element (not shown) enclosed within the housing. The electrodes 72 and 74 are in contact with the conducting strip sections 22*c* and 24*b*, respectively.

As seen in FIGURE 4, the emitter lead 70 is brought out transversely to a shorting pin 76, which is considerably larger than the ordinary shorting pins 78, so as to provide a low impedance conducting path between the emitter of the transistor 66 and the ground planes 42 and 44 (FIGURE 3) connected by the shorting pin. It is generally desirable that the length of the lead 70 be substantially less than a quarter wavelength at the operating frequency. Instead of a number of individual shorting pins, the unit may be provided with metallic walls connecting the ground planes together and extending along the path described by the pins 78 in FIGURE 4. A construction of this type is disclosed in my copending application Serial No. 28,409, which is now Patent Number 3,015,081 for Tri-Plate Modular Components, filed May 11, 1960, and assigned to the assignee of this application.

A pair of leads 80 and 82 of fine wire extend transversely from the conducting strip sections 24*b* and 22*c* beyond the field of the transmission line thence to a power supply generally indicated at 84. The high resistance and inductive reactance of the leads 80 and 82 at microwave frequencies serve to isolate the conducting strips 22 and 24 from the power supply 84. A pair of bypass capacitors schematically indicated at 86 and 88 enhance this effect .

The power supply 84 is adapted to provide the voltages and currents required for bias power by the transistor 66. Furthermore, as used herein, the term "power supply" includes the provision of a local oscillator signal in cases where such signal is injected into the base or collector circuit of the transistor. When this is the case, appropriate modifications in the leads 80 and 82 and capacitors 86 and 88, apparent to those skilled in the art, may be made.

Assuming operation of the transistor 66 as an amplifier, and input signal entering from the left (FIGURE 3) is carried between a center conductor comprising the conducting strip sections 22*b* and 24*b* and a ground plane system comprising the conductors 42 and 44. The input signal is thus supplied between the emitter and base of the transistor 66 by way of the emitter lead 70 and the base electrode 74 contacting the section 24*b*. The output signal of the transistor is developed between the emitter lead and the collector electrode 72 contacting the strip section 22*c*. This signal is conducted from the transistor between the ground plane system and a center conductor comprising the sections 22*c* and 24*c*.

In order to optimize power transfer at the transistor, the characteristic impedance of the section of transmission line connected to the input thereof should match the terminating impedance appearing between the base and emitter. Similarly, the output impedance of the transistor should match, insofar as practicable, the characteristic impedance of the section of transmission line connected to it. In order to provide these impedance matches, the characteristic impedance of the transmission line may be adjusted by varying the widths of the center conductors comprising the respective conducting strips. Capacitive feed-through at the transistor will ordinarily be relatively small, since the longitudinal and transverse dimensions of the housed transistor, as viewed in FIGURE 4, may both be on the order of 0.060 inch or less. The combined thickness of the housing 68 and electrodes 72 and 74, may be on the order of 0.014 inch.

It will be apparent that the construction described above minimizes the problem of lead capacitance and inductance, since the external leads coming from the housing 68 are sections of transmission line, which, assuming proper termination, are not reactive. Furthermore, considering the small size of the transistor 66, the leads within the housing 68 are almost negligibly short. Fabrication of a transistor-transmission line unit of the type described above is a relatively simple procedure.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A transistor-transmission line package comprising, in combination, a strip transmission line including a pair of ground plane conductors, a pair of spaced-apart inner conducting strips in register with each other and disposed between said ground plane conductors, a transistor including a housing with a pair of electrodes on opposing sides thereof and a lead extending from a third side thereof, said transistor being disposed between said conducting strips with one of said electrodes in contact with one of said strips and the other of said electrodes in contact with the other of said strips, and means connecting said lead to said ground plane conductors.

2. The combination defined in claim 1 including means connected between said ground plane conductors to maintain them at the same potential, said conducting means being spaced transversely from said conducting strips and extending along said transmission line, said lead extending transversely from said housing and connecting with said conducting means.

3. The combination defined in claim 1 including a power supply and conducting means extending transversely of said line and connecting said power supply to said inner conducting strips.

4. The combination defined in claim 1 in which said conducting strips have gaps on both sides of said transistor and including capacitance means forming a low impedance path between the portions of each strip on opposite sides of the gaps therein.

5. The combination defined in claim 1 in which said electrodes are connected to the base and collector, respectively, of said transistor and said lead is connected to the emitter thereof.

6. A transistor-transmission line package comprising, in combination, a strip transmission line including a pair of ground conductors, a pair of spaced-apart inner conducting strips in register with each other and disposed between said ground plane conductors, conducting means spaced transversely from said conducting strips on both sides thereof and connecting said ground plane conductors together to maintain them at substantially the same potential, a first gap in one of said conducting strips and a second gap in the other of said strips, said gaps being spaced apart longitudinally to provide overlapping portions of said strips, a transistor having a housing, electrodes on opposite sides of said housing connected to elements of said transistors within said housing said transistor being spaced between said overlapping portions with said electrodes in contact therewith, a first lead extending transversely from said housing and connecting with said conducting means, a power supply, second and third leads extending from said conducting strips to said power supply, said second and third leads providing relatively high impedance paths and said first lead a relatively low impedance path at the operating frequency of said package.

7. The combination defined in claim 6 in which said conducting strips have gaps on both sides of said transistor and including capacitance means forming a low impedance path between the portions of each strip on opposite sides of the gaps therein.

8. The combination defined in claim 7 including conducting means maintaining said conducting strips at the same potential.

References Cited in the file of this patent

UNITED STATES PATENTS 2,913,686 Fubini ---------------- Nov. 17, 1959
2,954,468 Matthaei -------------- Sept. 27, 1960